US005925399A

United States Patent [19]
Cheng et al.

[11] Patent Number: 5,925,399
[45] Date of Patent: Jul. 20, 1999

[54] REDUCTION OF CHOCOLATE BLOOM

[75] Inventors: Pu-Sheng Cheng, Dublin; Stephen J. Destephen, Columbus, both of Ohio

[73] Assignee: Nestec S.A., Vevey, Switzerland

[21] Appl. No.: 09/089,952

[22] Filed: Jun. 3, 1998

[51] Int. Cl.$^6$ .......................................... A23G 1/00
[52] U.S. Cl. .......................... 426/631; 426/660; 426/423
[58] Field of Search ................................ 426/631, 660, 426/423

[56] References Cited

U.S. PATENT DOCUMENTS

| 4,643,898 | 2/1987 | Peters | 424/155 |
| 4,647,459 | 3/1987 | Peters | 424/155 |
| 4,652,458 | 3/1987 | Frost et al. | 426/573 |
| 5,284,659 | 2/1994 | Cherukuri | 424/441 |

FOREIGN PATENT DOCUMENTS

| 2168071 | 6/1986 | Germany. |
| WO 82 01720 | 5/1982 | WIPO. |

OTHER PUBLICATIONS

Stecher 1968 The Merck Index 8th ed. Rahway NJ p. 946.
Grant 1969 Hackh's Chemical Dictionary McGraw–Hill Book Co. New York p. 610.
Minifie 1980 Chocolate, Cocoa and Confectionery; Science and Technology 2nd ed. AVI Publishing Co. Inc. Westport CT pp. 494–509.

*Primary Examiner*—Carolyn Paden
*Attorney, Agent, or Firm*—Pennie & Edmonds LLP

[57] ABSTRACT

A process for preparing chocolate or a fat containing confectionery material which comprises incorporating from 0.01 to 0.5% by weight of a silicon dioxide into the chocolate or a fat containing confectionery material during its preparation.

7 Claims, No Drawings

REDUCTION OF CHOCOLATE BLOOM

FIELD OF THE INVENTION

The present invention relates to a process for the reduction of chocolate bloom.

BACKGROUND OF THE INVENTION

Fat bloom is the development of crystals of unstable fat on the surface of chocolate and vegetable fat coatings on storage. In some circumstances, bloom will also form on milk chocolate. Although bloom is detrimental to the appearance of the chocolate, it does not harm its eating qualities. Certain fats when added to chocolate can inhibit bloom formation, the best known being butter oil. The best protection is obtained by adding about 4% butter oil to the chocolate but such a relatively large amount has an appreciable softening effect on the chocolate which tends to lose its snap. However, the anti-bloom effect of butter oil does not apply to vegetable-fat coatings such as lauric fat coatings, e.g. stearines. Other fatty materials have been tried but generally they have not been completely satisfactory.

SUMMARY OF THE INVENTION

We have found that by adding a silicon dioxide in certain selected proportions to the chocolate, the bloom is significantly reduced on storage and the desirable snap is retained. In addition, the the anti-bloom effect also applies to vegetable-fat coatings such as lauric and non-lauric fat coatings.

Accordingly, the present invention provides a process for preparing chocolate or a fat containing confectionery material which comprises incorporating from 0.01 to 0.5% by weight of a silicon dioxide into the chocolate or a fat containing confectionery material during its preparation.

DETAILED DESCRIPTION OF THE INVENTION

In this invention, it should be understood that silicon dioxide may have various morphologies well known to the person skilled in the art and includes the product known as fumed silica and the like. Fumed silica also has various grades and particle sizes morphologies well known to the person skilled in the art. It should, of course, be food acceptable.

One method of preparing fumed silica involves the vapor phase hydrolysis of silicon tetrachloride in hydrogen oxygen flame. The combustion process creates silicon dioxide molecules that condense to form particles which collide, attach and sinter together. The result of these processes is a three-dimensional branched chain aggregated with a length of approximately 0.2 to 0.3 microns. Once the aggregates cool below the fusion point of silica (1710° C.), further collisions result in mechanical entanglement of chains, termed agglomeration. Further agglomeration takes place in the collection system to yield a fine white fluffy powder with an agglomerate size of less than 44 microns.

The theory of anti-blooming properties from silicon dioxide is not known. Although not wishing to be bound by theory, it is postulated that the silicon dioxide forms a network of three-dimensional H-bonds which impede the migration of fat molecules, and slow down the blooming process.

The amount of silicon dioxide incorporated in the chocolate or a fat containing confectionery material is preferably from 0.025 to 0.40%, more preferably from 0.05 to 0.35% and even more preferably from 0.1 to 0.30% by weight based on the weight of the chocolate or a fat containing confectionery material.

The chocolate material may be dark, milk or white chocolate.

Fat containing confectionery materials may include products containing sugar or sugar replacers, milk derived components, and fat and solids from vegetable or cocoa sources in differing proportions having a moisture content less than 10%, more usually less than 5% by weight. The fat containing confectionery materials may be chocolate substitutes such as compound coatings containing cocoa liquor, cocoa powder or cocoa butter alternatives which may comprise vegetable fats such as cocoa butter equivalents (CBE) or cocoa butter substitutes (CBS) which are well known to those skilled in the art, e.g. CBS laurics and CBS nonlaurics, such as stearines, coconut oil, palm oil, butter or any mixture thereof; (see Chocolate, Cocoa, and Confectionery; Third Edition, 1989, Bernard W. Minifie; AVI, pp100–109); nut pastes such as peanut butter and fat; praline; confectioner's coatings used for covering cakes usually comprising chocolate analogues with cocoa butter replaced by a less expensive non-tempering fat; or "Caramac" sold by Nestle comprising non-cocoa butter fats, sugar and milk.

The silicon dioxide may be added at any stage during the production of the chocolate or a fat containing confectionery material as long as a good mixing procedure is provided. For example, it may be added to any of the ingredients, preferably the cocoa butter or fat substitute before or after conching, before or after tempering, or to the liquid tempered chocolate before solidification, or before it is poured into a mould.

The present invention also provides a chocolate or fat containing confectionery material containing from 0.01 to 0.5% by weight of a silicon dioxide based on the weight of the chocolate or fat containing confectionery material.

We have found that the chocolate or fat containing confectionery material prepared according to this invention had significantly reduced bloom after 9 months storage when compared with a chocolate or fat containing confectionery material in which silica gel had not been incorporated.

EXAMPLES

The following Examples further illustrate the present invention.

Example 1

Fumed silica (Cab-O-Sil from Cabot Corporation), FDA approved for food use was added to a liquid cocoa butter substitute—a partially hydrogenated palm kernel oil with emulsifier, and blended with the remaining compound ingredients, i.e. cocoa powder, low-fat milk powder, sugar, etc. in an amount of 0.25% by weight based on the total weight of the mixture. The mixture was mixed well and molded into bars.

After 9 months storage the bars had significantly reduced bloom when compared with bars in which fumed silica had not been incorporated. In addition, the product retained its snap.

Example 2

Fumed silica (Cab-O-Sil), FDA approved for food use was added to melted cocoa butter and, and blended with the remaining compound ingredients, i.e. cocoa liquor, whole milk powder, sugar, lecithin, etc. in an amount of 0.25% by weight based on the total weight of the mixture. The mixture was conched and tempered in the normal way and molded into bars.

The chocolate product, after 9 months storage, had significantly reduced bloom when compared with a similar product in which fumed silica had not been incorporated. In addition, the product retained its snap.

We claim:

1. A process for preventing bloom in chocolate or a fat containing confectionery material which comprises incorporating from 0.01 to 0.5% by weight of a silicon dioxide into the chocolate or a fat containing confectionery material during its preparation.

2. A process according to claim 1 wherein the chocolate material is dark, milk or white chocolate.

3. A process according to claim 1 wherein the fat containing confectionery material is a product containing sugar or sugar replacers, milk derived components, and fat and solids from vegetable or cocoa sources in differing proportions having a moisture content less than 5% by weight.

4. A process according to claim 1 wherein the fat containing confectionery materials is a compound coating containing cocoa liquor, cocoa powder or cocoa butter alternatives comprising vegetable fats.

5. A process according to claim 1 wherein the silicon dioxide is added at any stage during the production of the chocolate or a fat containing confectionery material.

6. A process according to claim 1 wherein the silicon dioxide is added to any of the ingredients before or after conching, before or after tempering, or to the liquid tempered chocolate before solidification, or before it is poured into a mould.

7. A process according to claim 1 wherein the silicon dioxide is fumed silica.

* * * * *